Nov. 23, 1926.

F. K. BENEDICT
SHAPER FOR SAW TEETH
Filed Oct. 23, 1924

1,608,157

Inventor
Frederick K. Benedict

By Geo. B. Willcox
Attorney

Patented Nov. 23, 1926.

1,608,157

UNITED STATES PATENT OFFICE.

FREDERICK K. BENEDICT, OF BIG RAPIDS, MICHIGAN, ASSIGNOR TO MACHINERY COMPANY OF AMERICA, OF BIG RAPIDS, MICHIGAN.

SHAPER FOR SAW TEETH.

Application filed October 23, 1924. Serial No. 745,403.

This invention is a shaper for saw teeth. It pertains more particularly to side dressers for bringing the swaged teeth of band-saws to uniform width and shape.

More specifically my present improvement comprises a device whereby the action of the shaper is made very sensitive so the operator can get better "feel" and thereby more accurately control the action of the shaper on the teeth.

My improvement makes the shaping operation especially smooth and easy. The shaper rides the saw very evenly and smoothly and acts upon each tooth with ease and precision, which enables the operator to "sense" the exact position and action of the shaper on each tooth, without effort and with a resulting uniformity of action which has not been secured heretofore in shapers having pivoted and swinging dies.

The object of my present improvement is to insure that the contact point between the die, or the die-carrier and the end of the die-actuating screw shall be coaxial with the screw.

Heretofore shapers equipped with pivoted dies, that is, with dies mounted on the pivoted die carriers and capable of slight angular movement at their free ends toward and from the saw, have been acuated by screws having flat ends or slightly rounded ends by which the screw pressure is transmitted to the die.

Although the angular movement of the die or die-carrier is in practice very slight, yet there is sufficient change of angular position to shift the position of the bearing contact surface, and this shifting of position occurs while the tooth is being swaged, with the result that even slight wear or distortion takes place and a grinding or wiping action occurs between the end of the screw and the surface of the die-carrier, or of the die, as the case may be.

In this art it is well known that the effectiveness and value of a saw tooth shaper depends to a considerable extent upon the accuracy of the "feel" by which the operator senses the position of the dies with respect to the tooth point and the condition of the work between the dies.

Even very slight resistances such as caused by the action of the flat or slightly rounded screw ends above referred to, greatly decrease the effectiveness and usefulness of the tool. To overcome this difficulty and to insure that the frictional resistance shall remain as nearly constant as possible and shall not change on account of wear or changes in the angular position of the die-carrier, and to further insure that the contact between the pressure screw and the die shall be coaxial with the screw, I have devised the improvement herein described.

With the foregoing and certain other objects in view, which will appear later in the specifications, my invention comprises the devices described and claimed and the equivalents thereof.

In the drawings Fig. 1 is a part sectional plan view of a shaper embodying my improvement.

Figure 1:
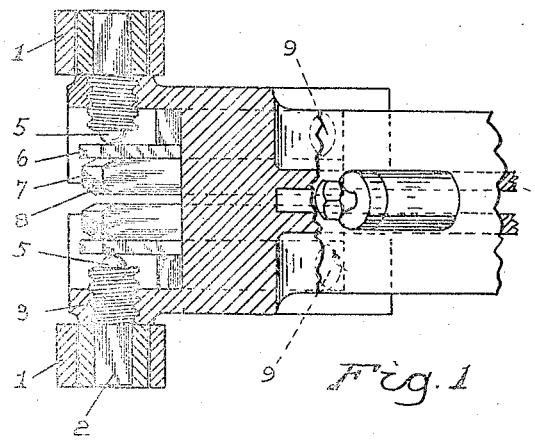
Figure 2:
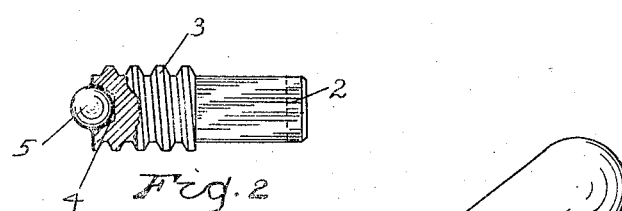
Fig. 2 is a part sectional detail of my improved die-actuating screw.
Figure 3:
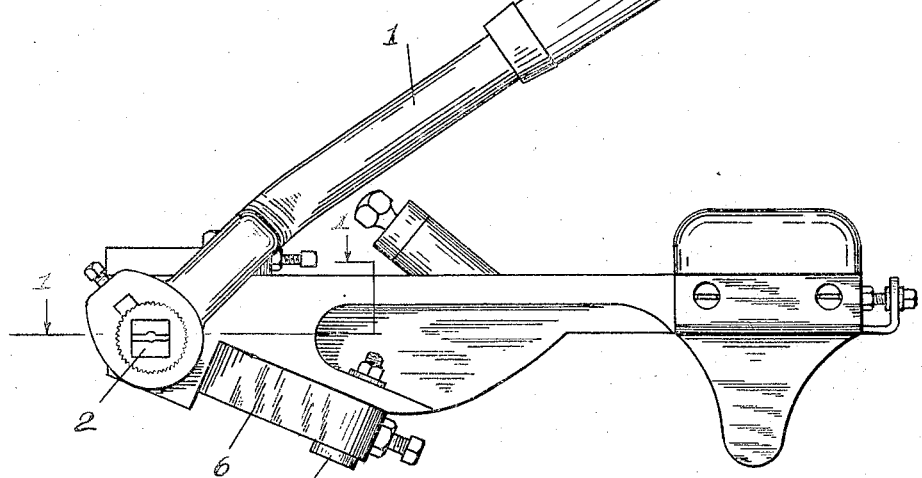
Fig. 3 is a side view of the shaper.

As is clearly shown in the drawings, 1 is the usual lever, fitted to the shank 2 of the die-actuating screw 3. In my improvement I form a recess 4 in the end of the screw and in this recess is seated a ball 5 which is coaxial with the screw.

6 is the usual die-carrier, upon which is fastened the die 7, preferably formed with a beveled working face 8.

The die-carrier is pivoted in the usual manner to the base of the shaper by a pintle bolt 9.

In operation, the dies are brought together at their free ends by means of the handle 1 and the screws 3 thus will have a slight angular movement.

By means of the ball 5 interposed between the end of the screw and the die-carrier, the line of application of the force of the screw is always kept coaxial with the screw and there is no shifting of the location of the bearing surface between the screw and die while the swaging operation is taking place. Consequently the tool has a "feel" that is uninfluenced by the friction or working face of the screw and the die or the die-carrier.

Having thus described my invention, what I claim and desire to secure by Letters Patent is:

1. In combination, a shaper for the points of saw teeth including a body and a pair of die-carriers pivoted thereto, at their rear ends and adapted to be actuated toward and from each other at their free ends a die-actuating screw having a recessed end and a ball seated in said recess, said ball taking against the outer face of said die-carrier near its free end.

2. In combination, a shaper for the points of saw teeth including a body and a pair of die-carriers pivoted thereto, a die-actuating screw, and a ball rotatably supported, co-axially with said screw, between the end of the screw and one of said die-carriers, said ball taking against the outer face of said die-carrier near its free end, for the purposes set forth.

3. In a shaper for the points of saw teeth including a die-carrier pivotally supported at one end, the free end thereof capable of slight angular movement about said pivotal support, a die-actuating screw having an operating handle, and a bearing-ball interposed between the end of said screw and said die-carrier near the free end thereof.

In testimony whereof I affix my signature.

FREDERICK K. BENEDICT.